US 7,780,775 B2

(12) United States Patent
Healy et al.

(10) Patent No.: US 7,780,775 B2
(45) Date of Patent: Aug. 24, 2010

(54) PROCESS FOR THE PREPARATION OF A NOVEL PIGMENTED COMPOSITION FOR USE IN OFFSET INKS

(75) Inventors: Thomas Healy, Paisley (GB); David Cameron, Skelmorlie (GB)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 472 days.

(21) Appl. No.: 11/919,602

(22) PCT Filed: Apr. 24, 2006

(86) PCT No.: PCT/EP2006/061775

§ 371 (c)(1), (2), (4) Date: Oct. 30, 2007

(87) PCT Pub. No.: WO2006/117303

PCT Pub. Date: Nov. 9, 2006

(65) Prior Publication Data

US 2009/0069468 A1    Mar. 12, 2009

(30) Foreign Application Priority Data

May 2, 2005    (EP) .................................. 05103652

(51) Int. Cl.
C09D 11/08    (2006.01)
C09D 11/10    (2006.01)

(52) U.S. Cl. ............... 106/31.73; 106/31.13; 106/31.6; 106/31.72; 106/31.88; 106/493; 106/496; 106/498; 106/500; 523/160; 524/81; 524/88; 524/187; 524/270; 524/424

(58) Field of Classification Search .................. 524/81, 524/88, 187, 270, 424, 798; 523/160; 106/31.13, 106/31.6, 31.72, 31.73, 31.75, 31.85, 31.88, 106/31.9, 493, 496, 498, 500
See application file for complete search history.

(56) References Cited

U.S. PATENT DOCUMENTS

| 37,191 | A | 5/1929 | Tomiya et al. .............. 106/412 |
|---|---|---|---|
| 4,475,950 | A | 10/1984 | Finlayson .................... 106/20 |
| 4,857,624 | A | 8/1989 | DeBlasi et al. .............. 528/129 |
| 5,158,606 | A | 10/1992 | Carlick et al. ................ 524/145 |
| 5,776,237 | A | 7/1998 | Tomiya et al. .............. 106/412 |
| 5,942,028 | A | 8/1999 | Tomiya et al. ............ 106/31.78 |
| 5,964,929 | A | 10/1999 | Langley et al. ........... 106/31.66 |
| 6,037,396 | A | 3/2000 | Sawada ....................... 524/231 |
| 6,425,948 | B1 | 7/2002 | Nowak et al. ............ 106/31.15 |
| 6,503,965 | B1 | 1/2003 | Nowak et al. ............... 523/161 |
| 6,797,748 | B2 | 9/2004 | Chen et al. .................. 523/161 |
| 2005/0119369 | A1* | 6/2005 | Imagawa et al. ............ 523/160 |
| 2005/0143488 | A1* | 6/2005 | Dandreaux et al. ......... 523/160 |

FOREIGN PATENT DOCUMENTS

| EP | 0 041 838 | 12/1981 |
|---|---|---|
| EP | 0 281 720 | 9/1988 |
| EP | 0 392 334 | 10/1990 |
| EP | 0 808 878 | 11/1997 |
| EP | 0 867 487 | 9/1998 |
| GB | 1 224 627 | 3/1971 |
| JP | 4-320458 | 11/1992 |
| JP | 10-279872 | 10/1998 |
| JP | 11/293169 | 10/1999 |
| JP | 2003-041173 | 2/2003 |
| JP | 2003-231829 | 8/2003 |
| JP | 2003-335997 | 11/2003 |
| KR | 6370 | 2/1979 |
| WO | 02/16515 | 2/2002 |
| WO | 02/16516 | 2/2002 |
| WO | 02/100960 | 12/2002 |

OTHER PUBLICATIONS

Machine Translation of JP 2001-181530A.*
G. Lobbert, Phthalocyanines 4.4.2.
English language abstract from the esp@cenet web cite printed on Dec. 7, 2007.
Patent Abstracts of Japan 11-021488.
Patent abstracts of Japan 11-035841.
Patent abstracts of Japan 2003-335976.
G. Strom et al.; 8$^{th}$ Tappi Symposium, (2003)pp. 136-147.
Patent Abstracts of Japan 2002-173627.
Patent Abstracts of Japan 61-181878.

* cited by examiner

Primary Examiner—David Wu
Assistant Examiner—Vu Nguyen
(74) Attorney, Agent, or Firm—Tyler A. Stevenson

(57) ABSTRACT

The invention pertains to a novel, simpler dry-milling method for comminuting crude pigments (especially crude phthalocyanines) for use in offset inks, wherein a high amount of resin is used, at least part of which is a low molecular phenol-modified rosin, an esterified rosin or a hydrocarbon resin of similar properties, preferably together with an antioxidant, and dry-milling is performed at relatively low temperature. The invention also pertains to the thus obtained, new compositions, which are extraordinarily easily dispersible in hydrocarbon solvents, and their use for the preparation of inks or ink concentrates. Pigment dispersions obtained from the preferred compositions are also claimed.

20 Claims, No Drawings

PROCESS FOR THE PREPARATION OF A NOVEL PIGMENTED COMPOSITION FOR USE IN OFFSET INKS

The invention pertains to a novel, simpler dry-milling method for comminuting crude pigments (especially crude phthalocyanines) for use in offset inks, wherein a high amount of resin is used, at least part of which is a low molecular phenol-modified rosin, an esterified rosin or a hydrocarbon resin of similar properties, preferably together with an antioxidant, and dry-milling is performed at relatively low temperature. The invention also pertains to the thus obtained, new compositions, which are extraordinarily easily dispersible in hydrocarbon solvents, and their use for the preparation of inks or ink concentrates. Pigment dispersions obtained from the preferred compositions are also claimed.

Phthalocyanines are a typical example of crude pigments which are not useful as such for pigmentary purposes. The coarse crystals of crude phthalocyanines must be acid-pasted or ground to smaller size, a process of greater importance than the synthesis and first described in 1936. High color strength and good dispersive properties can be obtained when water-soluble salts such as sodium chloride or anhydrous sodium sulfate are used as grinding agents, either in dry form or with a small amount of solvents such as alcohols. Washing out the salts with water gives a color-intensive pigment. This simple procedure has often been modified, for example by addition of surfactants, dispersants or resins. Crude phthalocyanines can also be ground in the dry state without grinding aids but often with a surfactant. However, this milled product exhibits satisfactory pigment properties only after further treatment in water immiscible organic solvents (see Ullmann's Encyclopedia of Industrial Chemistry [2002], chapter about Phthalocyanines, §4.4.2.).

KR 6370 B discloses kneading crude phthalocyanine with salt and polyols in the presence of phthalocyanine derivatives. JP H04/320 458 A contends that energy savings are possible in this typical process by first dry-milling the crude phthalocyanine with the phthalocyanine derivatives and then only kneading with salt and an organic liquid such as polyethylene glycol.

GB 1 224 627 discloses dry-milling colorants together with hard resinous materials, for example 147 grams of crude copper phthalocyanine with 300 grams of rosin-modified phenolic resin having a softening point of 175° C. The product is disclosed to be equal in colour strength but slightly redder in shade, as compared with a flushed, pigmentary grade pigment.

EP 0 281 720 B1 discloses powdery flexographic and gravure printing ink compositions which are obtained by blending a conventionally finished pigment with a dry resin (nitrocellulose), adding a solid plastifier (dicyclohexyl phthalate), then comminuting and agglomerating the mixture in an inert gas atmosphere without melting the components. The solid ink easily dissolves by stirring in a volatile organic solvent (mixture of ethyl alcohol, isopropylacetate and methoxypropanol).

EP 0 392 334 B2 teaches to dry-mill crude copper phthalocyanine with only from 0.5 to 10% of resin so as to obtain primary particles of size ≦1 μm and ≦60% α-form and to avoid the risk of adhesion and caking. The resulting composition is then subjected to wet-milling under heat together with a binder solution and additives (extender, plastifier, antioxidant and wax) to obtain a pasty, highly viscous printing ink.

U.S. Pat. No. RE 37,191 E teaches to dry-mill crude phthalocyanine together with from 1 to 200% by weight of resin in an inert atmosphere. In the examples, from 10 to 100% by weight of a rosin modified phenolic resin of softening point 160° C. are used. The mixture of α- and β-form is then converted to the pure β-form in a solvent. However, this method produces undesirably large particles (up to about 7 μm) and requires heating as well as several passes through a three roll mill (or through a pearl mill according to JP H11/021 488 A) for dispersion.

EP 0 819 740 B2 (WO 97/28 224 A1) discloses dry-milling crude copper phthalocyanine with from 20 to 80% of resin and dry-milling the mixture while heating to a temperature of from 80 to 170° C., preferably from 115 to 170° C. Apparently the same resin is used as in U.S. Pat. No. RE 37,191 E. The mill-base is then heated in a solvent until the aspect ratio is below 2 and most α is converted to β. Dispersion, however, requires further grinding in a three roll mill. The quality of the final ink is purportedly equal to that of inks obtained from conventional salt-kneaded pigments. Closely similar is JP H11/035 841 A, which performs the dry-milling process in two steps.

JP2003/041 173 A discloses a process for producing printing ink wherein crude phthalocyanine is dry-milled with an extender such as calcium carbonate, a resin is then added, and the resulting mixture is dry-milled again or mixed vigorously for a short period of time to avoid degradation. An ink concentrate is obtained after two passes on the three roll mill, which concentrate is then diluted to an ink.

JP2003/231 829 A discloses a process for producing printing ink wherein crude phthalocyanine is first surface treated with a rosin in a solvent, leading to a pre-pigment which is dried then dry-milled, generally with an extender and further resin. An ink concentrate is obtained after heating for two hours to 110-120° C., followed by two passes on the three roll mill, then dilution to an ink.

EP 0 774 494 B2 discloses a process for the production of ink concentrates, wherein crude copper phthalocyanine is dry-milled with from 0.1 to 50% of a phenolic resin, then extruded with a high boiling alcohol (cetyl alcohol) under high shear. The concentrate is easily let down with an ink varnish.

JP2003/335 997 A proposes to dry-mill crude copper phthalocyanine with from 10 to 20% of resins having a softening temperature of 165° C. or more, preferably modified rosins lacking metal cations. In analogy with EP 0 392 334 B2, a higher amount of resin is disclosed to be undesirable. Amongst the resins used in the examples, there are two rosin-modified phenolic resins of $M_W$ 10 459 and 65 000. The final ink is made by heating the millbase to 120° C. in a varnish, then processing in the three roll mill.

JP2003/335 976 A discloses dry-milling crude copper phthalocyanine of purity ≧97% together with a resin, then conditioning the millbase in aqueous ethyl-cellosolve. In the examples, from 20 to 40% of a rosin-modified phenol resin of $M_w$ 123 000 is used. The conditioned pigment is filtered, washed, dried and ground. JP H10/279 872 A discloses lithographic printing inks comprising a resin extracted from gilsonite and having a softening point of 120-125° C., a non-aromatic petroleum solvent having an aniline point of 90-110° C. and a synthetic resin, for example, 0.5-20% gilsonite based resin, 5-40% synthetic resin and 25-50% non-aromatic petroleum solvent. In the examples, 20% of carbon black is used as a pigment, which is incorporated into solutions of the resins.

JP H11/293 169 A discloses lithographic printing inks comprising a resin extracted from gilsonite and having a softening point of 120-125° C., a non-aromatic petroleum solvent having an aniline point of 90-110° C. and vegetable oil, for example 10-30% carbon black, 0.5-20% gilsonite based resin, 5-30% synthetic resin, 10-40% non-aromatic petroleum solvent and 10-50% vegetable oil. The pigment is incorporated into solutions of the resins.

However, none of these prior art processes is entirely satisfactory. The kneading method is slow, requires expensive machinery and high amounts of water-soluble salts and solvents must be disposed of. Phthalates are increasingly becoming undesirable as plastifiers for ecotoxicological reasons. Environmental, safety and health concerns arise when compositions comprising solvents are heated to higher temperatures in an open equipment. Prolonged dispersion on a three roll or pearl mill requires a rigorous quality control, because the pigment particles are ground again. Extruders are not universally available at ink manufactures or printing plants.

Thus, there is a strong demand for pigments which show top performance in printing inks without requiring special efforts from the ink makers, who prefer to concentrate their efforts on developing better ink compositions while starting from already finished, easily dispersible pigments from pigment manufacturers.

Hence, the invention's goal was to simplify the whole process manufacture of offset inks while improving their properties. Surprisingly, this could be achieved by providing a novel type of pigment preparation, which can simply be dispersed by stirring in non-polar inks based on non-aromatic hydrocarbon solvents. Much better results are surprisingly obtained, than could be expected from the prior art.

WO 02/16 515 and WO 02/16 516 disclose inks, especially useful for ballpoint pens, which are based on pigment dispersions in non-aqueous solvents comprising alkyd resins and from 0.1 to 30% of antioxidants. WO 02/100 960 replaces the alkyd resin by a polyurethane resin. According to TAPPI Advanced Coating Fundamentals Symposium, $8^{th}$ Chicago, 137-146 [2003], antioxidants highly increase the initial phase of drying, as may of course be important for ballpoint pen inks but is undesirable in offset speed machinery.

JP 2002/173 627 A discloses printing ink compositions comprising a non-drying oil-modified alkyd resin, a drying oil-modified alkyd resin and from 0.1 to 25% of a rosin-modified phenolic resin. The additional use of 2,6-di-tert.-butyl-4-methyl-phenol as an antioxidant is disclosed in the examples. These inks are applied on chromium-plated steel (film cartridges) and dried for 8-10 minutes at 160-170° C. A higher amount of rosin-modified phenolic resin leads to poor adherence.

EP 0 867 487 A2 further discloses the use of antioxidants in solvent-free hot-melt inks comprising solvent dyes and waxes. U.S. Pat. No. 4,475,950 discloses heat-set inks comprising organophilic clay gellants and small amounts of ionol. EP 0 041 838 A2 uses from 0.01 to 5% of antioxidants in varnishes comprising oil- and rosin-modified phenolic resins, in which finished pigments are then dispersed using a three roll mill; these varnishes are gelled for 1 hour at 160° C. with an aluminium chelate. JP S61/181 878 A uses antioxidants in oil inks for inkjet for preventing the printer's electrodes from being corroded.

Highly surprisingly, it has now been found that a significant progress is obtained by dry-milling crude pigments in the presence of a high amount of resin comprising a low molecular weight phenol-modified rosin, an esterified rosin or a hydrocarbon resin of similar properties and preferably an antioxidant while avoiding overheating. The resulting pigment composition is extraordinarily well dispersible in hydrocarbon-based solvents and varnishes comprising hydrocarbon-based solvents, even non-aromatic ones. Thus, it is not necessary to use three roll or pearl mills, though this is of course feasible if desired. In addition, the colour strength is improved and the hue is closer to the industry standards for cyan. On the contrary to the teachings of the prior art, there is no adhesion or caking in the dry-mill despite the presence of a high quantity of resin, and the process appears to be generally safe. The ink's drying and hardening properties are satisfactory notwithstanding the instant amount of antioxidant.

Hence, the invention pertains to a process for producing a pigment composition, comprising the step of milling a crude pigment together with from 150 to 400% by weight, especially from 150 to 350% by weight, preferably from 160% to 250% by weight, based on the amount of crude pigment, of a resin composition comprising from 5 to 100% by weight, preferably from 10 to 100% by weight, of a phenol-modified rosin fraction of molecular weight from 5000 to 40 000 Da;

from 5 to 80% by weight, preferably from 10 to 80% by weight, of a hydrocarbon resin of softening point from 105 to 165° C., preferably from 110 to 160° C.;

from 5 to 50% by weight, preferably from 10 to 50% by weight, of an esterified rosin;

from totally 5% by weight to a maximal total percentage comprising each below 5% by weight, preferably from totally 10% by weight to a maximal total percentage comprising each below 10% by weight, of two resins selected from the group consisting of said phenol-modified rosin fraction, said hydrocarbon resin and said esterified rosin; or from totally 5% by weight to a maximal total percentage comprising each below 5% by weight, preferably from totally 10% by weight to a maximal total percentage comprising each below 10% by weight, of all three resins of the group consisting of said phenol-modified rosin fraction, said hydrocarbon resin and said esterified rosin;

each based on the weight of the resin composition; and optionally further components, comprising preferably from 1 to 10% by weight, based on the amount of crude pigment, of an antioxidant.

wherein the composition remains pulverulent or granular during milling.

The amount of resin composition is to be understood as the total amount of solid resins (or binders) in the resin composition, excluding any further components, such as solvents, plasticizers or other additives. Generally, solid resins are organic compounds of melting point, softening point and dropping point at least 40° C., preferably at least 60° C., and molecular weight of from about $3 \cdot 10^3$ to $3 \cdot 10^8$ Da. The resin composition may consist essentially of one or more resins, for example from 2 to 50 resins, preferably from 2 to 8 resins.

The amount of optional further components, each of which can be added independently from the others at once or in portions at any stage of the process either before or during or after dry-milling, is most suitably chosen according to the amount of pigment, resin and antioxidant, in order the amount of pigment to be from 10 to 40% by weight of the total composition.

The crude pigment is a pigment as obtained from the synthesis after drying, comprising from 10 to 100% by weight of primary particles and/or aggregates of size $\geqq 10$ μm. Drying, however, does not exclude the presence of low amounts of residual moisture (water and/or organic solvents). Generally, crude is preferred which has not been acid-pasted or recrystallised. Suitable crude pigments are both inorganic and organic, preferably organic pigments or carbon blacks, most preferred polycyclic pigments, especially phthalocyanines, in particular copper phthalocyanines such as Colour Index Pigment Blue 15:1, 15:3, 15:6 or 16 as well as Pigment Green 7, 36 or 37, and dioxazines such as Pigment Violet 23 or 37. Crude copper phthalocyanine is prepared by any of the well established processes such as reaction of phthalic anhydride with urea and a copper salt in the presence of a catalytic amount of a transition metal compound such as ammonium molybdate, the reaction being carried out at elevated temperature in a high boiling aromatic solvent such as nitrobenzene or in the absence of a solvent in a "dry-bake" melt process. Standard processes for the production of crude copper phthalocyanine are detailed in "Phthalocyanine Compounds" by Moser and Thomas, Rheinhold Publishing Corporation 1963, the disclosures of which are incorporated herein by reference. Crude copper phthalocyanine produced according to these processes is of non-pigmentary size, typically ranging from 10 μm-100 μm.

To prepare dioxazine derivatives, generally chloranil is first reacted with aromatic amines in the presence of acid-binding agents (e.g., sodium acetate) to form the 2,5-diarylamino-3,6-dichlorobenzoquinone. The corresponding dichlorodiphene-dioxazine is obtained by oxidative cyclization of the latter in a high-boiling solvent in the presence of a catalyst (e.g., aluminum chloride or benzenesulfochloride) that lowers the cyclization temperature.

Carbon blacks for use as a pigment are industrially manufactured products, which are produced under carefully controlled conditions and consist of elemental carbon with extremely small particles, which may also contain chemically bound hydrogen, oxygen, nitrogen, and sulfur. It can be produced by simply burning oils, fats, or resinous materials and quenching or cooling the flame either on a cool surface (impingement black) or in special chimneys (lamp black); such a process is also known as the "Degussa gas black process". Most important is the furnace black process (developed in the USA in the 1930s and substantially improved after 1945), a continuous process allowing the production of a variety of carbon black grades under carefully controlled conditions. Further processes known as thermal black and acetylene black processes are used for the production of specialties.

However, surprisingly the process of the invention is not only advantageous for phthalocyanine, dioxazine and carbon black pigments. On the contrary, notably useful are many more pigments described in the Colour Index or otherwise known, such as Pigment Yellow 1, 3, 12, 13, 14, 15, 17, 24, 34, 42, 53, 62, 73, 74, 83, 93, 95, 108, 109, 110, 111, 119, 120, 123, 128, 129, 139, 147, 150, 151, 154, 164, 168, 173, 174, 175, 180, 181, 184, 185, 188, 191, 191:1, 191:2, 193, 194 and 199; Pigment Orange 5, 13, 16, 22, 31, 34, 40, 43, 48, 49, 51, 61, 64, 71, 73 and 81; Pigment Red 2, 4, 5, 23, 48, 48:1, 48:2, 48:3, 48:4, 52:2, 53:1, 57, 57:1, 88, 89, 101, 104, 112, 122, 144, 146, 149, 166, 168, 170, 177, 178, 179, 181, 184, 185, 190, 192, 194, 202, 204, 206, 207, 209, 214, 216, 220, 221, 222, 224, 226, 242, 248, 254, 255, 262, 264, 270 and 272; Pigment Brown 23, 24, 25, 33, 41, 42, 43 and 44; Pigment Violet 19, 23, 29, 31, 37 and 42; Pigment Blue 15, 15:1, 15:2, 15:3, 15:4, 15:6, 16, 25, 26, 28, 29, 60, 64 and 66; Pigment Green 7, 17, 36, 37 and 50; Pigment White 6, 6:1 and 7; Pigment Black 6, 7, 8, 10, 12, 27, 30, 31, 32 and 37; Vat Red 74; 3,6-di(3',4'-dichloro-phenyl)-2,5-dihydro-pyrrolo[3,4-c] pyrrole-1,4-dione, 3,6-di(4'-cyano-phenyl)-2,5-dihydro-pyrrolo[3,4-c]pyrrole-1,4-dione and 3-phenyl-6-(4'-tert-butyl-phenyl)-2,5-dihydro-pyrrolo[3,4-c]pyrrole-1,4-dione; as well as mixtures and solid solutions thereof.

Besides the above-mentioned, most preferred polycyclic pigments, azo pigments such as disazo yellow pigments or laked azo red pigments are particularly interesting. Preferred disazo yellow pigments or laked azo red pigments are Pigment Yellow 12, Pigment Yellow 13, Pigment Red 48:1, Pigment Red 48:2, Pigment Red 48:3, Pigment Red 48:4, Pigment Red 52:2, Pigment Red 53:1, Pigment Red 57 or Pigment Red 57:1.

Azo pigments are generally prepared in known ways, for example by azo coupling and if applicable condensation or laking with a metal (preferably divalent).

Phenol-modified rosins (also called rosin-modified phenol resins or synthetic copals though rosin generally predominates in quantity and character), are well-known in the art and used in inks as hard resins. Their usual weight average molecular weight ($M_W$) is from about 65 000 to 300 000 Da (dalton). There are also phenol-modified rosins of lower weight average molecular weight, such as from about 10 000 to 30 000 Da.

The invention can suitably be performed either with a single phenol-modified rosin of low weight average molecular weight, or with a mixture of a single phenol-modified rosin of low weight average molecular weight with one or more phenol-modified rosins of high weight average molecular weight. Essential is that there is at least a fraction of from 5 to 100% by weight, preferably from 10 to 100% by weight, more preferably from 15 to 80% by weight, most preferred from 30 to 55% by weight, phenol-modified rosin of molecular weight from 5000 to 40 000 Da, based on the total weight of resin. A resin comprising a fraction of 100% phenol-modified rosin of molecular weight from 5000 to 40 000 Da consists entirely of such phenol-modified rosin. Fractions of less then 100% imply either that the resin comprises further components or that the phenol-modified rosin has a molecular weight distribution which is broader than the range of molecular weight from 5000 to 40 000 Da. In the latter case, the molecular weight distribution of the phenol-modified rosin preferably comprises a fraction of molecular weight >40 000 Da, and eventually also a fraction of molecular weight <5000 Da.

Instead of a phenol-modified rosin of low weight average molecular weight or in addition to it, one can alternatively use an esterified rosin, which is a rosin the carboxy groups of which are esterified with a polyalcohol having for example from 2 to 12, preferably from 3 to 6 hydroxy groups, such as glycerol or pentaerythritol. However, phenol-modified rosin of low weight average molecular weight is generally preferred to esterified rosins and leads surprisingly to even higher dispersibility, especially in combination with phenol-modified rosin of high weight average molecular weight.

Instead of a phenol-modified rosin of low weight average molecular weight and/or an esterified rosin or in addition to them, one can further alternatively also use a hydrocarbon resin of softening point from 105 to 165° C., preferably from 110 to 160° C. The hydrocarbon resin may optionally be a modified or hybrid hydrocarbon resin, which are known in the art.

Phenol-modified rosins of low weight average molecular weight are generally preferred to esterified rosins and hydrocarbon resins.

Of course, it is also possible to use a combination of phenol-modified rosins, esterified rosins and/or hydrocarbon resins. In such case, it is only necessary that the amount of one of the phenol-modified rosin of low weight average molecular weight, the esterified rosin or the hydrocarbon resin is within the above-mentioned range, or that the total amount of two or three of these resins is at least 5% by weight. The amounts of the other or other two of these three resins may also be within their respective ranges, but this is not at all mandatory. On the contrary, resin amounts below the minimum value (such as up to 4.99%, preferably up to 9.99%) are perfectly suitable provided that at least one of the specified resins is present in the specified amount, or that the total amount of two or three resins is within the corresponding range. Nevertheless, preferably the maximal amounts of all three of the phenol-modified rosin of low weight average molecular weight, the esterified rosin and the hydrocarbon resin do not exceed the respective maximal limits.

The molecular weight distribution of polymers can be determined by well-known methods, such as for example through ultracentrifugation and gel permeation. In general, phenol-modified rosins of weight average molecular weight ($M_W$) from about 10 000 to 30 000 Da can be reasonably assumed to have a molecular weight distribution within the instant range of from 5000 to 40 000 Da, so that in many cases it is not even necessary to determine their molecular weight distribution experimentally. The softening point is suitably determined by methods well-known in the art, for example through the ring and ball method.

Commercial phenol-modified rosins can be used as such provided they contain a suitable fraction of molecular weight from 5000 to 40 000 Da. Preferably, however, suitable phenol-modified rosins are prepared by blending phenol-modified rosins of different weight average molecular weight and optionally other types of resins. In mixture with a phenol-modified rosin of low weight average molecular weight, with a hydrocarbon resin of softening point from 105 to 165° C., preferably from 110 to 160° C., and/or with an esterified rosin, phenol-modified rosins of high weight average molecular weight are generally used in amounts of from 0 to 90% by weight, preferably from 15 to 75% by weight, most preferred from 25 to 55% by weight, based on the total amount of resin. The phenol-modified rosin of high weight average molecular weight for use in the process of the invention has preferably a weight average molecular weight from 70 000 to 300 000 Da, particularly preferably from 80 000 to 200 000 Da, and can be added at any stage of the instant process, preferably at least in part before or during milling.

Apart of phenol-modified rosins, the resin may also comprise other resins, such as rosin, the principal component of which is abietic acid (minor components being isomers and/or homologues thereof, such as neoabietic acid, levopimaric acid, pimaric acid, isopimaric acid and/or palustric acid); chemically modified rosins such as hydrogenated, dehydrogenated or disproportionated rosins; dimerised or polymerized rosins; esterified rosins or partially esterified rosins; modified maleic rosin; hydrocarbon and modified hydrocarbon resins; alkyd resins or mixtures thereof; especially resins selected from the group consisting of hydrocarbon resins, modified hydrocarbon resins, esterified rosins and mixtures thereof, preferably hydrocarbon and/or modified hydrocarbon resins in amounts of up to 80% by weight, especially from 2 to 35% by weight, most preferred from 5 to 25% by weight, and/or esterified rosins in amounts of up to 50% by weight, especially from 5 to 35% by weight, most preferred from 15 to 25% by weight, all based on the total amount of resin. These resins are generally considered as soft and suitably have lower softening or melting ranges than the phenol-modified rosins, for example in the range from 80 to 160° C., preferably in the range from about 120 to about 150° C.

The preferred quantities are preferably combined together. Thus, preferably the resin comprises from 30 to 93% by weight of one or more phenol-modified rosins, a fraction of from 20 to 85% by weight thereof being of molecular weight from 5000 to 40 000 Da, from 2 to 35% by weight of one or more hydrocarbon and/or modified hydrocarbon resins and from 5 to 35% by weight of one or more esterified rosins. Most preferred, the resin comprises from 55 to 80% by weight of one or more phenol-modified rosins, a fraction of from 35 to 70% by weight thereof being of molecular weight from 5000 to 40 000 Da, from 5 to 25% by weight of one or more hydrocarbon and/or modified hydrocarbon resins and from 15 to 25% by weight of one or more esterified rosins.

Accordingly, the phenol-modified rosin preferably also comprises a fraction of from 15 to 80% by weight of molecular weight above 40 000 Da. Thus, the resin most preferably comprises from 4.5 to 74.4% by weight, especially from 16.5 to 52.0% by weight, of a phenol-modified rosin fraction of molecular weight from 70 000 to 300 000 Da.

The above ranges for the phenol-modified rosin's fraction of molecular weight from 70 000 to 300 000 Da (used in addition to the fraction of molecular weight from 5000 to 40 000 Da) correspond from 15% of total 30% to 80% of total 93% phenol-modified rosin, and from 30% of total 55% to 65% of total 80% phenol-modified rosin, respectively.

Also essential is the total amount of resin. It has been found that less than 150% by weight of resin, based on the crude pigment, surprisingly leads to poor dispersibility while more than 350 to 400% by weight of resin, based on the crude pigment, leads to poor colour strength. The total amount of resin is preferably from 160% to 250% by weight of resin, based on the crude pigment.

Much preferably, an antioxidant is also added. It has been found that there is a synergistic effect between the low molecular weight phenol-modified rosin fraction, the hydrocarbon resin and/or the esterified rosin and the antioxidant, possibly a plasticizing effect or inhibition of changes in molecular weight during dry-milling. The antioxidant is most preferably added in an amount of from 2 to 6% by weight, based on the crude pigment.

Further optional components are those well-known in the art. For example, small amounts of common liquid solvents such as chlorinated or aromatic hydrocarbons or alcohols can be used as phase directors, provided that the millbase composition remains pulverulent or granular during milling. These solvents may be present as residual "moisture" in the dry crude pigment. Hyperdispersants, waxes, extenders and/or dyestuffs can be added as well in usual amounts if desired. Preferably, the further components also include crystal growth inhibitors, rheology improvers and/or dispersants, most of which are well-known pigment derivatives, wherein the chromophore core (sometimes in reduced or oxidized form) is substituted by metal or ammonium sulfonates (for example sodium, laurylammonium or quaternary (ar-)alkyl ammonium sulfonates, which may further have hydroxy groups), or by tertiary aminomethyl groups (for example dimethylaminomethyl, phthalimidomethyl, N-saccharinylmethyl or N-pyrazolylmethyl).

Preferred are crystal growth inhibitors, rheology improvers or dispersants having phthalocyanine, 1,4-diketo-2,5-dihydro-pyrrolo[3,4c]pyrrole, dioxazine, perylene, quinacridone, quinacridonequinone and/or 6,13-dihydroquinacridone cores. It is most adequate to use crystal growth inhibitors, rheology improvers or dispersants which are either colorless or exhibit a colour similar to the colour of the pigment to be milled ($\Delta h^* \leq 30$ in 50:50 masstone with $TiO_2$), preferably but not necessarily the same or a closely related core.

Milling, as defined herein, means a process by which the solids are subject to attrition, grinding or the like to achieve particle size reduction. In this instance the milling technique involved is dry-milling which means a process for size reduction which is substantially free of liquid. However, a low level of solvent may be present during the milling stage as long as the resultant milled material remains a free flowing dry powder. Suitable equipment for dry-milling may for example be a rotating or vibrating ball mill, each working either batchwise or continuously, or a jet- or high-speed mill.

The dry-milling process is most suitably operated at a temperature below the melting point of the components, particularly of the antioxidant, especially when the components are added separately. However, it is also possible for example first to incorporate the antioxidant into the phenol-modified rosin or another resin and then to mill at a temperature above the melting point of the antioxidant but lower than the softening point of resin/antioxidant blend.

Suitable are all known antioxidants, for example alkyl phenols, alkylthiomethyl-phenols, eugenol, secondary amines, thioether, phosphites, phosphonites, dithiocarbamates, gallates, malonates, propionates, acetates and other esters, carboxamides, hydroquinones, ascorbic acid, triazines, benzyl compounds as well as tocopherols and analogue terpenes. Such antioxidants are known to the skilled artisan and also available commercially, for example from the sources indicated in WO 02/100 960 (page 13/lines 1-20) or under the trade marks IRGANO® and TINUVINO® (Ciba Specialty Chemicals Inc.). General information about antioxidants can be found in Taschenbuch der Kunststoff-Additive (R. Gächter and H. Müller, Carl Hanser Verlag München Wien, 2. Ausg. 1983, ISBN 3-446-13689-4) or Plastics Additives Handbook (H. Zweifel, 5$^{th}$ Ed. 2001, Hanser Publishers Munich, ISBN 3-446-21654-5), too.

The preferred antioxidants are hindered alkyl phenols and especially 2,6-di-tert.-butyl-p-cresol, the melting point of which is 71° C. Thus, dry-milling is particularly preferred performed at a temperature of 70° C. or below, for example from 0 to 70° C. The same temperature range is nevertheless valid for other antioxidants, too. As dry-milling generates heat, the dry-mill should be cooled efficiently so as to maintain an inner temperature of preferably from 50 to 65° C., most preferably from 55 to 62° C. Lower temperatures are suitable but require more cooling energy without providing any benefits. Higher temperatures up to just below the antioxidant's melting point or just below the resin/antioxidant blend's softening point are also suitable but must be tightly controlled in order to avoid any local overheating.

Hindered alkyl phenols are phenols having at least one and preferably two alkyl groups ortho to the phenolic hydroxy. One or preferably both alkyl groups ortho to the phenolic hydroxy are preferably secondary or tertiary alkyl, most preferred tertiary alkyl, especially tert.-butyl, tert.-amyl or 1,1,3,3-tetramethylbutyl.

The mill can if desired be inertised partially or entirely with an inert gas, such as $CO_2$, $N_2$ or Ar. However, generally inertisation does not provide major advantages.

The compositions obtained by the process of the invention are also new. Hence, the invention also pertains to a pulverulent or granular composition comprising from 10 to 40% by weight, based on the composition, of a dry-milled pigment;

from 150 to 400% by weight, especially from 150 to 350% by weight, preferably from 160% to 250% by weight, based on the amount of crude pigment, based on the amount of said pigment, of a resin composition comprising from 5 to 100% by weight, preferably from 10 to 100% by weight, of a phenol-modified rosin fraction of molecular weight from 5000 to 40 000 Da;

from 5 to 80% by weight, preferably from 10 to 80% by weight, of a hydrocarbon resin of softening point from 105 to 165° C., preferably from 110 to 160° C.;

from 5 to 50% by weight, preferably from 10 to 50% by weight, of an esterified rosin;

from totally 5% by weight to a maximal total percentage comprising each below 5% by weight, preferably from totally 10% by weight to a maximal total percentage comprising each below 10% by weight, of two resins selected from the group consisting of said phenol-modified rosin fraction, said hydrocarbon resin and said esterified rosin; or from totally 5% by weight to a maximal total percentage comprising each below 5% by weight, preferably from totally 10% by weight to a maximal total percentage comprising each below 10% by weight, of all three resins of the group consisting of said phenol-modified rosin fraction, said hydrocarbon resin and said esterified rosin;

each based on the weight of the resin composition;

and preferably from 1 to 10% by weight, based on the amount of crude pigment, of an antioxidant.

The dry-milled pigment of the invention should be understood to be a pigment as obtainable by the instant process, not having been additionally subjected after dry-milling to a solvent treatment to substantially modify or improve its crystallinity, crystal phase, particle shape, particle size or particle size distribution. The dry-milled pigment of the invention has characteristically primary particles of average size from 0.005 to 0.2 μm, preferably from 0.01 to 0.05 μm (as observed by transmission electron microscopy for deagglomerated particles), which primary particles are generally highly aggregated, at least 90% by weight of the aggregates having an apparent particle diameter of from 1 μm to 1 mm, preferably an average apparent particle diameter of from 10 to 500 μm (as measured for example on a Malvern™ dry powder particle size analyser). Of course, it is also possible to manufacture the instant composition by a different process, as long as the pigment therein has the same characteristics as obtainable by the instant milling process.

However, though feasible, such alternative process is generally less advantageous.

The instant composition, which may also comprise further components as disclosed above, is easily dispersed in liquid hydrocarbons or compositions comprising liquid hydrocarbons, such as varnishes for offset printing inks.

Hence, the invention also pertains to a process for preparing a pigment dispersion, comprising the step of adding to the instant composition from 80 to 700% by weight, preferably from 100 to 400% by weight, based on the amount of pigment in said composition, of a liquid hydrocarbon.

The hydrocarbon can be added neat or in combination with further components dissolved or dispersed therein, such as those usually comprised in ink varnishes. Such further components are well-known in the art and do not require to be enumerated in detail here. One may if desired consult a handbook, for example Ullmann's Encyclopedia of Industrial Chemistry, ©2000, Printing Inks—Offset Printing. Typical examples are alkyd resins, soya oil, higher ($C_8$-$C_{24}$, preferably $C_{12}$-$C_{18}$) alcohols, modified phenolic resins, waxes, extenders, hyperdispersants and other resins at the appropriate concentration for final ink formulation.

Suitable hydrocarbons have at least 6, preferably at least 8 carbon atoms, most preferred at least 12 carbon atoms, and they can be linear, branched and/or cyclic, and fully saturated or partially insaturated with up to about 25% insaturated or aromatic bonds. Most preferably, the number of insaturated or aromatic bonds is from 0 to 5%. Hydrocarbons are preferably used as mixtures of isomers and/or homologues, in which case the above number of carbon atoms is applicable for the weight average of the mixture (determined for example by HPLC) and the above number of insaturated and/or aromatic bonds is applicable for the molar average in the mixture (determined for example by $^{13}$C-NMR spectroscopy, 25% multiple bonds corresponding to one of four carbon atoms at a multiple bond).

Examples are aliphatic hydrocarbons such as cyclohexane, methylcyclohexane, heptane, octane, decalin, dodecane and higher homologues commonly called boiling range petrol, petroleum ether, ligroin, mineral oil or also simply printing ink distillate. Such commercially available mixtures of technical grade usually comprise no or only minor amounts of insaturated and/or aromatic bonds as indicated above. Higher aromatic or insaturated hydrocarbons such as, for example, naphthalene, fluorene, terphenyl or P-carotene are less suitable.

The hydrocarbon has preferably a boiling point of from 100 to 350° C. at $10^5$ Pa, more preferably a boiling point of from 150 to 350° C. at $10^5$ Pa, most preferred a boiling point of from 200 to 300° C. at $10^5$ Pa. The hydrocarbon is suitably liquid at the temperature of processing, preferably liquid at 20° C. However, it is also possible to use hydrocarbons with melting points for example from 20 to 70° C., if dispersion is intended at increased temperature or additional liquid solvents are added which inhibit crystallisation of the hydrocarbon.

The pigment is generally dispersed with low dispersion energy and advantageously retains its typical characteristics as obtained by dry-milling. For example, copper phthalocyanine remains a mixture of α and β crystal phases, typically with from 60 to 98% by weight, preferably from 60 to 90% by weight of the β crystal phase. Also the shape of the particles with damaged edges and corners is typical of dry-milling. Thus, differentiation from recrystallized pigments is normally easy though this depends highly on the pigment's chemical identity.

Preferably, satisfactory dispersion is surprisingly achieved with an energy input of from 0.05 to 5 kJ per gram of pigment, more preferably from 0.1 to 3 kJ per gram of pigment, especially from 0.15 to 2 kJ per gram of pigment, for example about 0.27±0.1 kJ per gram of pigment in an extruder such as a Berstorff™ extruder or particularly preferably about 1.4±0.4 kJ per gram of pigment [0.39±0.14 kWh per kilogram of pigment] in a disperser such as a Dispermat™ disperser. This procedure ensures that there is no significant crystal growth or change during dispersion. Dispersion times of from 15 minutes to 5 hours, preferably from 30 minutes to 1 hour, are generally satisfactory. The use of a three-roll mill or similar equipment is advantageously not necessary. There is no requirement for several subsequent dispersion steps (multiple passes) either; on the contrary, a single dispersion step is generally well suitable. The instantly required dispersion energy is surprisingly much lower than in a three roll mill, where usually above 6 to 10 kJ/g of pigment are required for the first pass and above 10 to 15 kJ/g for 3 passes.

Preferably, dispersion is obtained with heating, advantageously in a closed vessel, for example to temperatures from 80 to 140° C., especially from 80 to 110° C., most preferred from 85 to 95° C. Advantageously, upon heating the compositions of the invention for dispersion, the pigment is surprisingly converted for its most part to the beta crystal phase, leading to for example from 90 to 98% by weight β-form, preferably from 95 to 98% by weight β-form. If desired, in many cases it is possible through longer or higher heating upon dispersion to reach from 98 to 99% by weight β-form or even from 99 to 99.5% by weight β-form. It is also possible but generally not necessary to add a phase director.

Suitable low shear dispersing equipment is for example a disperser, such as low and high speed stirrers or mixers which are fitted with suitable agitation heads, for example high speed Dispermat™ or premix stirrers fitted with a cowles impeller, a trifoil impeller or a butterfly impeller, low shear stirrers including conventional stirrers capable of low speed agitation using anchor and paddle stirrers for agitation. However, one can alternatively also use equipment adequate to reach higher shear, such as an extruder or a three roll or pearl mill, preferably under mild operating conditions.

It is suitable to disperse the pigment at a concentration level of from 5 to 30% by weight, based on the total weight of the dispersion. Preferably, the pigment is dispersed at a concentration level of from 10 to 25% by weight, based on the total weight of the dispersion. In a particular aspect of the invention, the pigment is first dispersed at a concentration level of from 15 to 25% by weight, based on the total weight of the dispersion, then further at a level of from 10 to 14% by weight, based on the total weight of the dispersion.

Hence, the invention also pertains to a pigment dispersion comprising from 10 to 25% by weight, based on the total weight of the dispersion, of a dry-milled pigment;

from 150 to 400% by weight, especially from 150 to 350% by weight, preferably from 160% to 250% by weight, based on the amount of crude pigment, based on the amount of said pigment, of a resin composition comprising from 5 to 100% by weight, preferably from 10 to 100% by weight, of a phenol-modified rosin fraction of molecular weight from 5000 to 40 000 Da;

from 5 to 80% by weight, preferably from 10 to 80% by weight, of a hydrocarbon resin of softening point from 105 to 165° C., preferably from 110 to 160° C.;

from 5 to 50% by weight, preferably from 10 to 50% by weight, of an esterified rosin;

from totally 5% by weight to a maximal total percentage comprising each below 5% by weight, preferably from totally 10% by weight to a maximal total percentage comprising each below 10% by weight, of two resins selected from the group consisting of said phenol-modified rosin fraction, said hydrocarbon resin and said esterified rosin; or from totally 5% by weight to a maximal total percentage comprising each below 5% by weight, preferably from totally 10% by weight to a maximal total percentage comprising each below 10% by weight, of all three resins of the group consisting of said phenol-modified rosin fraction, said hydrocarbon resin and said esterified rosin;

each based on the weight of the resin composition;

from 80 to 700% by weight, preferably from 100 to 400% by weight, based on the amount of said pigment, of a liquid hydrocarbon;

and preferably from 1 to 10% by weight, based on the amount of crude pigment, of an antioxidant.

The dry-milled pigment is generally characterized as disclosed above. However, as disclosed above some dispersion methods and conditions lead to changes, depending also on the composition of the dispersion. The hydrocarbon may be liquid due to its low melting point, to melting point depression, to elevated temperature, to dissolution in other components of the dispersion or because crystallisation is retarded or slow.

The dry-milled pigment in the instant dispersion is preferably an organic pigment such as those mentioned above, most preferred a phthalocyanine or dioxazine pigment. These pigments dispersions are especially advantageous for the preparation of offset inks.

The pigment dispersion may optionally also contain further solvents, preferably from 1 to 50% by weight, based on the amount of pigment, of a $C_8$-$C_{24}$ alcohol. The pigment dispersion preferably also comprises from 2 to 35% by weight of one or more hydrocarbon and/or modified hydrocarbon resins and from 5 to 35% by weight of one or more esterified rosins, both based on the total amount of phenol-modified rosins, hydrocarbon and/or modified hydrocarbon resins and esterified rosins in the pigment dispersion.

The pigment dispersions of the invention are advantageously used for the preparation of offset printing inks. The technique of preparing offset printing inks is well-known in the art. Surprisingly, it is possible to prepare offset printing inks starting from the pigment dispersions of the invention without grinding the pigment dispersion in a three-roll or pearl mill. Preferably, the offset printing inks are prepared from the pigment dispersions of the invention with a disperser or only a single pass in a three-roll or pearl mill, most preferred without using a three-roll or pearl mill. Instead, it is preferable to use low shear equipment as disclosed above.

Of course, the instant compositions can also be incorporated into solid binders by kneading or extrusion, thus producing masterbatches or ink concentrates. Thus, the invention also pertains to a process for the preparation of a pigment composition, wherein a composition instantly obtained by dry-milling is kneaded or extruded with from 0 to 300% by weight, based on the pigment composition obtained by dry-milling, of a binder which is solid at 20° C. This process enables the preparation of compositions comprising special binders, which are themselves not suitable for the instant dry-milling process. Useful binders include for example those disclosed in WO 05/044924. These pigment compositions may be further processed into inks according to usual processes, or also at low shear just like the instant dry-milled compositions.

The examples which follow illustrate the invention, without limiting it in any way ("%" are by weight where not otherwise specified):

COMPARATIVE EXAMPLE 1

(analogous to EP 0 774 494 B2) 89.1 g of crude copper phthalocyanine, 15.0 g of sodium chloride and 2.5 g of hydrogenated resin (Staybelite™-E resin) are ground together in a ballmill until the phase change gives and alpha content between 45%-65%. 75 g of the milled material are added to a solvent mixture containing 17 g of n-butanol and 208 g of water with agitation. 1.4 ml of a 46% potassium hydroxide solution is added and the slurry heated to reflux (93° C.) for 4 hours. 100 ml of cold water are added in order to cool the slurry, which is then acidified with aq. HCl, filtered, washed salt and solvent free, and dried at 75° C. 18 g of the resultant pigment is added to 132 g of the following ink vehicle:

| | |
|---|---|
| Low viscosity alkyd resin (51 ± 5 Pa · s/≦16 mgKOH/g) | 9.1% |
| Dodecanol | 2.4% |
| Soya oil | 12.8% |
| Aromatic free distillate (boiling range 230-290° C.) | 38.25% |
| Phenolic modified rosin ($M_w$ ≈ 12 000) | 22.6% |
| Phenolic modified rosin ($M_w$ ≈ 100 000) | 10.9% |
| Hydrocarbon resin (d = 1.07 g/cm³, softening point 141° C.) | 3.6% |
| 2,6-Di-tert.-butyl-p-cresol | 0.35% |

The resulting mixture is stirred at 90° C. using a cowles impeller at 5000 rpm for 60 minutes. After pre-mixing, 1 mm glass beads are added and the mixture is bead milled for 15 minutes at 300 rpm and 90° C. The ink is then sieved to remove beads and given a single pass at 25 bar pressure on a Bühler SDY-200 3-roll mill at 23° C. The ink performance is assessed after the bead mill stage and after the single pass on the 3-roll mill.

The ink is then printed using a Prüfbau printing machine to give prints of differing film weights. The print density for each print is measured using a densitometer (Gretag D19C). The gloss is measured at equal film weight using an Erichsen mini glossmaster at 60°. The dispersion is characterised by microscope assessment.

COMPARATIVE EXAMPLE 2

The following mixture is charged to a vibrating ballmill:

| | |
|---|---|
| 30.0 g | crude copper phthalocyanine |
| 69.2 g | high molecular weight phenolic modified rosin ($M_w$ ≈ 100 000) |
| 0.93 g | 2,6-di-tert.-butyl-p-cresol |

The above mixture is milled at ≦65° C. to an α content of 30±10%. 60.0 g of the resulting mixture are added to 90.0 g of the following ink vehicle:

| | |
|---|---|
| Low viscosity alkyd resin (51 ± 5 Pa · s/≦16 mgKOH/g) | 13.5% |
| Dodecanol | 3.5% |
| Soya oil | 19.0% |
| Aromatic free distillate (boiling range 230-290° C.) | 64.0% |

The resulting mixture is stirred at 90° C. using a cowles impeller at 5000 rpm for 60 minutes. The resultant ink is then assessed as per comparative example 1 for dispersion and colouristic properties.

COMPARATIVE EXAMPLE 3

The following mixture is charged to a vibrating ballmill:

| | |
|---|---|
| 42.9 g | crude copper phthalocyanine |
| 56.0 g | low molecular weight phenolic modified rosin ($M_w$ ≈ 12 000) |
| 1.1 g | 2,6-di-tert.-butyl-p-cresol |

The above mixture is milled at ≦65° C. to an α content of 30±10%. 41.9 g of the resulting mixture are added to 108.1 g of the following ink vehicle:

| | |
|---|---|
| Low viscosity alkyd resin (51 ± 5 Pa · s/≦16 mgKOH/g) | 13.5% |
| Dodecanol | 3.5% |
| Soya oil | 19.0% |
| Aromatic free distillate (boiling range 230-290° C.) | 64.0% |

The resulting mixture is stirred at 90° C. using a cowles impeller at 5000 rpm for 60 minutes. The resultant ink is then assessed as per comparative example 1 for dispersion and colouristic properties.

EXAMPLE 1

The following mixture is charged to a vibrating ballmill:

| | |
|---|---|
| 37.0 g | crude copper phthalocyanine |
| 29.6 g | low molecular weight phenolic modified rosin ($M_w \approx$ 12 000) |
| 22.7 g | high molecular weight phenolic modified rosin ($M_w \approx$ 100 000) |
| 9.85 g | hydrocarbon resin (d = 1.07 g/cm³, softening point 141° C.) |
| 0.93 g | 2,6-di-tert.-butyl-p-cresol |

The above mixture is milled at ≦65° C. to an α content of 30±10%. 48.6 g of the resulting mixture are added to 101.4 g of the following ink vehicle:

| | |
|---|---|
| Low viscosity alkyd resin (51 ± 5 Pa · s/≦16 mgKOH/g) | 12.0% |
| Dodecanol | 3.1% |
| Soya oil | 16.7% |
| Aromatic free distillate (boiling range 230-290° C.) | 50.0% |
| Phenolic modified resin ($M_w \approx$ 100 000) | 18.6% |

The resulting mixture is stirred at 90° C. using a cowles impeller at 5000 rpm for 60 minutes. Almost full conversion to the β form is obtained. The resultant ink is then assessed as per comparative example 1 for dispersion and colouristic properties.

EXAMPLE 2

The following mixture is charged to a vibrating ballmill:

| | |
|---|---|
| 30.0 g | crude copper phthalocyanine |
| 69.2 g | low molecular weight phenolic modified rosin ($M_w \approx$ 12 000) |
| 0.8 g | 2,6-di-tert.-butyl-p-cresol |

The above mixture is milled at ≦65° C. to an α content of 30±10%. 60.0 g of the resulting mixture are added to 90.0 g of the following ink vehicle:

| | |
|---|---|
| Low viscosity alkyd resin (51 ± 5 Pa · s/≦16 mgKOH/g) | 13.5% |
| Dodecanol | 3.5% |
| Soya oil | 19.0% |
| Aromatic free distillate (boiling range 230-290° C.) | 64.0% |

The resulting mixture is stirred at 90° C. using a cowles impeller at 5000 rpm for 60 minutes. The resultant ink is then assessed as per comparative example 1 for dispersion and colouristic properties.

EXAMPLE 3

The following mixture is charged to a vibrating ballmill:

| | |
|---|---|
| 30.0 g | crude copper phthalocyanine |
| 69.2 g | low molecular weight phenolic modified rosin ($M_w \approx$ 12 000) |
| 0.8 g | 2,6-di-tert.-butyl-p-cresol |

The above mixture is milled at ≦65° C. to an α content of 30±10%. 60.0 g of the resulting mixture are added to 90.0 g of the following ink vehicle:

| | |
|---|---|
| Low viscosity alkyd resin (51 ± 5 Pa · s/≦16 mgKOH/g) | 13.5% |
| Dodecanol | 3.5% |
| Soya oil | 19.0% |
| Aromatic free distillate (boiling range 230-290° C.) | 56.5% |
| Phenolic modified resin ($M_w \approx$ 100 000) | 7.5% |

The resulting mixture is stirred at 90° C. using a cowles impeller at 5000 rpm for 15 minutes. The resultant ink is then assessed as per comparative example 1 for dispersion and colouristic properties.

EXAMPLE 4

The following mixture is charged to a vibrating ballmill:

| | |
|---|---|
| 37.0 g | crude copper phthalocyanine |
| 62.07 g | low molecular weight phenolic modified rosin ($M_w \approx$ 12 000) |
| 0.93 g | 2,6-di-tert.-butyl-p-cresol |

The above mixture is milled at ≦65° C. to an α content of 30±10%. 48.1 g of the resulting mixture are added to 101.4 g of the following ink vehicle:

| | |
|---|---|
| Low viscosity alkyd resin (51 ± 5 Pa · s/≦16 mgKOH/g) | 12.0% |
| Tridecanol | 3.1% |
| Soya oil | 16.6% |
| Aromatic free distillate (boiling range 230-290° C.) | 50.0% |
| Phenolic modified resin ($M_w \approx$ 100 000) | 6.5% |
| Phenolic modified resin ($M_w \approx$ 12 000) | 11.9% |

The resulting mixture is stirred at 90° C. using a cowles impeller at 5000 rpm for 60 minutes. The resultant ink is then assessed as per comparative example 1 for dispersion and colouristic properties.

EXAMPLE 5

The following mixture is charged to a vibrating ballmill:

| | |
|---|---|
| 30.0 g | crude copper phthalocyanine |
| 69.2 g | low molecular weight phenolic modified rosin ($M_w \approx$ 12 000) |
| 0.8 g | 2,6-di-tert.-butyl-p-cresol |

The above mixture is milled at ≦65° C. to an α content of 30±5%. 100.0 g of the resulting mixture are added to 50.0 g of the following ink vehicle:

| | |
|---|---|
| Dodecanol | 6.3% |
| Aromatic free distillate | 93.7% |

The resulting mixture is stirred at 90° C. using a cowles impeller at 5000 rpm for 60 minutes. The resultant 20% ink base is then reduced to 12% pigmentation by adding 97.1 g of the following vehicle:

| | |
|---|---|
| Low viscosity alkyd resin (51 ± 5 Pa · s/≦16 mgKOH/g) | 20.4% |
| Dodecanol | 2.0% |
| Soya oil | 28.7% |
| Aromatic free distillate (boiling range 230-290° C.) | 37.4% |
| Phenolic modified resin ($M_w \approx 100\,000$) | 11.5% |

The resultant ink is then assessed as per comparative example 1 for dispersion and colouristic properties.

EXAMPLE 6

The following mixture is charged to a vibrating ballmill:

| | |
|---|---|
| 30.0 g | crude copper phthalocyanine |
| 16.0 g | esterified rosin (d = 1.1 g/cm³, m.p. >145° C.) |
| 48.3 g | high molecular weight phenolic modified rosin ($M_w \approx 100\,000$) |
| 4.9 g | hydrocarbon resin (d = 1.07 g/cm³, softening point 141° C.) |
| 0.8 g | 2,6-di-tert.-butyl-p-cresol |

The above mixture is milled at ≦65° C. to an α content of 30±10%. 81.0 g of the resulting mixture are added to 119.0 g of an ink vehicle which contains the following:

| | |
|---|---|
| Low viscosity alkyd resin (51 ± 5 Pa · s/≦16 mg KOH/g) | 13.5% |
| Tridecanol | 3.5% |
| Soya oil | 19.0% |
| Aromatic free distillate (boiling range 230-290° C.) | 64.0% |

The resultant mixture is stirred in a sealed vessel using a conventional anchor stirrer for 4 hours at 120° C. The resultant ink 12% pigment containing is then assessed as per comparative example 1 for dispersion and colouristic properties.

Comparative Colouristic Properties (Taking the Final Ink of Example 1 as Standard, Dispersion Quality Assessed Visually with a Microscope):

| Example | Dispersion quality | Colour strength [%] | Gloss [%] |
|---|---|---|---|
| Comparative example 1 Beadmill ink | ---- | 76 | 82 |
| Comparative example 1 Final ink after 3 roll mill pass | • | 100 | 100 |
| Comparative example 2 | -- | 69 | 45 |
| Comparative example 3 | ---- | 75 | 71 |
| Example 1 | ++ | 104 | 108 |
| Example 2 | + | 111 | 137 |
| Example 3 | ++ | 102 | 138 |
| Example 4 | + | 108 | 109 |
| Example 5 | + | 108 | 128 |
| Example 6 | - | 107 | 108 |

++++ much superior
+++ moderately superior
++ slightly superior
+ faintly superior
• standard
- faintly inferior
-- slightly inferior
--- moderately inferior
---- much inferior The data show that the composition of the dry-milling mixture is clearly essential.

COMPARATIVE EXAMPLE 4

28 g of Irgalite® Magenta SMB (C. I. Pigment Red 57:1 is added to 125.2 g of an ink vehicle containing the following components:

| | |
|---|---|
| Low viscosity alkyd resin (51 ± 5 Pa · s/≦16 mg KOH/g) | 9.67% |
| Phenolic modified rosin ($M_w \approx 12\,000$) | 30.34% |
| Phenolic modified rosin ($M_w \approx 100\,000$) | 10.38% |
| Hydrocarbon resin (d = 1.07 g/cm³, softening point 141° C.) | 1.59% |
| Anti-oxidant (BHT) | 0.32% |
| Extender (aluminum silicate) | 7.98% |
| Microcrystalline wax | 3.51% |
| Soya oil | 9.58% |
| Aromatic free distillate (boiling range 230-290° C.) | 26.63% |

The resulting mixture is stirred at 90° C. using a cowles impeller at 2000 rpm for 10 minutes. The impeller speed is then increased to 16000 rpm and the premix stirred for a further 15 minutes at 90° C. The impeller speed is then reduce to 8000 rpm and the premix stirred for a further 15 minutes. Then, there are added to the ink premix 69.02 g of an ink vehicle of the following composition:

| | |
|---|---|
| Low viscosity alkyd resin (51 ± 5 Pa · s/≦16 mgKOH/g) | 32.19% |
| Tridecanol | 3.76% |
| Aromatic free distillate (boiling range 230-290° C.) | 64.05% |

This mixture is stirred for 10 minutes at 4000 rpm, then for a further 5 minutes after addition of further aromatic free distillate to make the ink weight up to 222.2 g. The ink is then given a single pass on the Bühler SDY-200 3-roll mill at 23° C./25 bar pressure. The ink performance is assessed after the premix stage and after the single pass on the 3-roll mill.

The ink is then printed using a Prüfbau printing machine to give prints of differing film weights. The print density for each print is measured using a densitometer (Gretag D19C). The gloss is measured at equal film weight using an Erichsen mini glossmaster at 60°. The dispersion is characterised by microscope assessment.

EXAMPLE 7

37 g of Irgalite® Magenta SMB (C. I. Pigment Red 57:1) and 70.06 g of phenolic modified rosin ($M_w \approx 12\,000$) are dry milled in a vibrating ball mill at <65° C. for 4 hours. 81.02 g of the resulting mixture is added to 72.2 g of an ink vehicle of the following composition:

| | |
|---|---|
| Low viscosity alkyd resin (51 ± 5 Pa · s/≦16 mgKOH/g) | 16.8% |
| Anti-oxidant (BHT) | 0.6% |
| Extender (aluminum silicate) | 13.8% |
| Microcrystalline wax | 6.1% |
| Soya oil | 16.6% |
| Aromatic free distillate (boiling range 230-290° C.) | 46.1% |

The resulting mixture is stirred at 90° C. using a cowles impeller at 2000 rpm for 10 minutes. The impeller speed is then increased to 16000 rpm and the premix stirred for a further 15 minutes at 90° C. The impeller speed is then reduced to 8000 rpm and the premix stirred for a further 15 minutes. Then, there are added to the ink premix 69.02 g of an ink vehicle containing the following:

| | |
|---|---|
| Low viscosity alkyd resin (51 ± 5 Pa · s/≦16 mgKOH/g) | 32.19% |
| Tridecanol | 3.76% |
| Aromatic free distillate (boiling range 230-290° C.) | 64.05% |

This mixture is stirred for 10 minutes at 4000 rpm, then for a further 5 minutes after addition of further aromatic free distillate to make the ink weight up to 222.2 g. The ink is then given a single pass on the Bühler SDY-200 3-roll mill at 23° C./25 bar pressure. The ink performance is assessed using the same methods, as in comparative example 4.

Comparative Coloristic Properties (Taking the Final Ink of Example 1 as Standard, Dispersion Quality Assessed Visually with a Microscope):

| Example | Dispersion quality | Colour strength [%] |
|---|---|---|
| Comparative example 4 Premix ink | --- | 80 |
| Example 7 Premix ink | – | 96 |
| Comparative example 4 Final ink after 3 roll mill pass | • | 100 |
| Example 7 Final ink after 3 roll mill pass | • | 100 |

++++ much superior
+++ moderately superior
++ slightly superior
+ faintly superior
• standard
– faintly inferior
-- slightly inferior
--- moderately inferior
---- much inferior The data show that the premix ink of example 7 is almost as good in dispersion quality and colour strength, as the final inks obtained after a 3 roll mill pass, while premixing in analogy to the prior art method is clearly insufficient.

EXAMPLE 8

20.00 g of crude C. I. Pigment Violet 23, 20.00 g phenolic modified rosin ($M_w$≈12 000), 10.00 g of hydrocarbon resin (d=1.07 g/cm$^3$, softening point 141° C.) and 1.0 g of anti-oxidant (BHT) are dry milled for 273 minutes in a vibrating ball mill at <65° C. 35.0 g of the resulting mixture is added to 64.0 g of an ink vehicle containing the following components:

| | |
|---|---|
| Low viscosity alkyd resin (51 ± 5 Pa · s/≦16 mgKOH/g) | 6.00 g |
| Phenolic modified rosin ($M_w$ ≈ 100 000) | 9.00 g |
| PTFE wax | 0.50 g |
| Soya oil | 6.00 g |
| Aromatic free distillate (boiling range 230-290° C.) | 36.25 g |
| Distillate containing 10% aromatics (boiling range 240-270° C.) | 6.25 g |

The resulting mixture is stirred at 100° C. using a cowles impeller at 5000 rpm for 60 minutes. The ink is then given a single pass on a 3-roll mill at 23° C. It is then reduced to 13% with high boiling point alcohol to enable printing.

COMPARATIVE EXAMPLE 5

14.00 g of commercially available, fine sized C. I. Pigment Violet 23 is mixed in a pot with the following varnish:

| | |
|---|---|
| Low viscosity alkyd resin (51 ± 5 Pa · s/≦16 mgKOH/g) | 6.00 g |
| Phenolic modified rosin ($M_w$ ≈ 100 000) | 26.00 g |
| Anti-oxidant (BHT) | 1.00 g |
| Hydrocarbon resin (d = 1.07 g/cm$^3$, softening point 141° C.) | 4.00 g |
| PTFE wax | 0.50 g |
| Soya oil | 6.00 g |
| Aromatic free distillate (boiling range 230-290° C.) | 36.25 g |
| Distillate containing 10% aromatics (boiling range 240-270° C.) | 6.25 g |

The resulting mixture is stirred at 60° C. using a Cowles impeller at 1000 rpm for 15 minutes, the impeller is then replaced with a nylon disc. 200 g of 1 mm glass beads are then added, the stirrer speed increased to 3000 rpm and the mixture stirred for 15 minutes. A temperature of 80° C. is maintained throughout. The ink is then sieved to remove beads and given a double pass at 10 bar pressure and a single pass at 25 bar pressure on the Bühler SDY-200 3-roll mill at 23° C. To enable printing, it is reduced to 13% pigment content with high boiling point alcohol. The resultant ink is compared to example 8 for dispersion and colouristic properties.

Comparative Coloristic Properties (Taking the Final Ink of Comparative Example 5 as Standard, Dispersion Quality Assessed Visually with a Microscope):

| Example | Dispersion quality | Colour strength [%] | Gloss [%] |
|---|---|---|---|
| Example 8 Premix and single pass in 3 roll mill | • | 105 | 108 |
| Comparative example 5 Premix, beadmill and three passes in 3 roll mill | • | 100 | 100 |

++++ much superior
+++ moderately superior
++ slightly superior
+ faintly superior
• standard
– faintly inferior
-- slightly inferior
--- moderately inferior
---- much inferior The data show that the ink of example 8 is as good in dispersion quality after a single 3 roll mill pass, as the ink of comparative example 5 after bead milling and three passes, while it has superior colour strength and gloss properties.

COMPARATIVE EXAMPLE 6

27.00 g C. I. Pigment Black 7 (Black Pearls 430™, Cabot Corp.) and 1.50 g Reflex Blue™ R54 (C. I. Pigment Blue 15 dispersion, Dispersion Technology Ltd) are mixed in a pot with 121.5 g of the following varnish:

| | |
|---|---|
| Phenolic modified rosin ($M_w$ ≈ 100 000) | 20.11 g |
| Phenolic modified rosin ($M_w$ ≈ 12 000) | 17.24 g |
| Low viscosity alkyd resin (51 ± 5 Pa · s/≦16 mgKOH/g) | 15.42 g |
| Gilsonite (naturally occurring resin) | 8.25 g |
| Soya oil | 13.35 g |
| Tridecanol | 1.47 g |
| Colorburst ™ dispersant | 1.03 g |
| Anti-oxidant (BHT) | 0.29 g |
| Aromatic free distillate (boiling range 230-290° C.) | 44.34 g |

The resulting mixture is stirred at 90° C. using a Cowles impeller at 5000 rpm for 60 minutes, the impeller is then replaced with a nylon disc, 200 g of 1 mm glass beads are added, the stirrer speed reduced to 3000 rpm and the mixture stirred for 15 minutes. A temperature of 90° C. is maintained throughout.

EXAMPLE 9

36.27 g C. I. Pigment Black 7 (Black Pearls 430™, Cabot Corp.), 2.02 g Reflex Blue™ R54 (C. I. Pigment Blue 15 dispersion, Dispersion Technology Ltd), 27.02 g phenolic modified rosin ($M_W \approx 100\,000$), 23.2 g phenolic modified rosin ($M_W \approx 12\,000$), 11.09 g gilsonite (naturally occurring resin) and 0.4 g of anti-oxidant (BHT) are dry milled for 2 h in a vibrating ball mill at <65° C. 74.4 g of the resulting mixture is added to 75.6 g of an ink vehicle comprising the following components:

| | |
|---|---|
| Low viscosity alkyd resin (51 ± 5 Pa · s/≦16 mgKOH/g) | 15.41 g |
| Soya oil | 13.36 g |
| Aromatic free distillate (boiling range 230-290° C.) | 44.33 g |
| Tridecanol | 1.47 g |
| Colorburst ™ dispersant | 1.03 g |

The resulting mixture is stirred at 90° C. using a Cowles impeller at 5000 rpm for 60 minutes. The dispersion and colouristic properties of the resultant ink are then compared to those of the ink according to comparative example 6.

Comparative Coloristic Properties (Taking the Final Ink of Comparative Example 6 as Standard, Dispersion Quality Assessed Visually with a Microscope):

| Example | Dispersion quality [NPIRI gauge] | Colour strength [%] | Gloss [%] | Low shear flow |
|---|---|---|---|---|
| Example 9 (premix only) | 0/0/10 | 113 | 120 | 10.5 |
| Comparative example 6 (premix and beadmill) | 0/0/13 | 100 | 100 | 11.5 |

The data show that the ink of example 9 is as good in dispersion quality without beadmilling, as the ink of comparative example 6 after beadmilling, while it has much superior colour strength and gloss properties.

The invention claimed is:
1. A process for producing a pigment composition, comprising the step of milling a crude pigment together with
from 150 to 400% by weight, based on the amount of crude pigment, of a resin composition comprising
from 5 to 100% by weight, of a phenol-modified rosin fraction of weight-average molecular weight from 5000 to 40000 Da;
from 5 to 80% by weight, of a hydrocarbon resin of softening point from 105 to 165° C.;
from 5 to 50% by weight, of an esterified rosin;
a from totally 5% by weight to a maximal total percentage comprising each below 5% by weight, of two resins selected from the group consisting of said phenol-modified rosin fraction, said hydrocarbon resin and said esterified rosin; or
from totally 5% by weight to a maximal total percentage comprising each below 5% by weight, of all three resins of the group consisting of said phenol-modified rosin fraction, said hydrocarbon resin and said esterified rosin;
each based on the weight of the resin composition; and
optionally from 1 to 10% by weight, based on the amount of crude pigment, of an antioxidant and
optionally, further components,
wherein the composition remains pulverulent or granular during milling.
2. A process according to claim 1, wherein the milling is carried out at a temperature from 0 to 70° C.
3. A pulverulent or granular composition obtained by dry-milling a mixture comprising
from 10 to 40% by weight, based on the composition, of a pigment;
from 150 to 400% by weight, based on the amount of crude pigment, of a resin composition comprising
from 5 to 100% by weight, of a phenol-modified rosin fraction of weight-average molecular weight from 5000 to 40000 Da;
from 5 to 80% by weight, of a hydrocarbon resin of softening point from 105 to 165° C.;
from 5 to 50% by weight, of an esterified rosin;
from totally 5% by weight to a maximal total percentage comprising each below 5% by weight, of two resins selected from the group consisting of said phenol-modified rosin fraction, said hydrocarbon resin and said esterified rosin; or
from totally 5% by weight to a maximal total percentage comprising each below 5% by weight, of all three resins of the group consisting of said phenol-modified rosin fraction, said hydrocarbon resin and said esterified rosin;
each based on the weight of the resin composition;
and from 1 to 10% by weight, based on the amount of crude pigment, of an antioxidant.
4. A process for preparing a pigment dispersion, comprising a step of milling a composition comprising
from 10 to 40% by weight, based on the composition, of crude pigment;
from 150 to 400% by weight, based on the amount of crude pigment, of a resin composition comprising
from 5 to 100% by weight, of a phenol-modified rosin fraction of weight-average molecular weight from 5000 to 40000 Da;
from 5 to 80% by weight, of a hydrocarbon resin of softening point from 105 to 165° C.;
from 5 to 50% by weight, of an esterified rosin;
from totally 5% by weight to a maximal total percentage comprising each below 5% by weight, of two resins selected from the group consisting of said phenol-modified rosin fraction, said hydrocarbon resin and said esterified rosin; or
from totally 5% by weight to a maximal total percentage comprising each below 5% by weight, of all three resins of the group consisting of said phenol-modified rosin fraction, said hydrocarbon resin and said esterified rosin;
each based on the weight of the resin composition;
and from 1 to 10% by weight, based on the amount of crude pigment, of an antioxidant,
wherein the composition remains pulverulent or granular during milling; and further comprising a step of adding to the resulting composition from 80 to 700% by weight, based on the amount of pigment in said composition, of a liquid hydrocarbon.

5. A process according to claim 4, wherein dispersion is accomplished with an energy input of from 0.05 to 5 kJ per gram of pigment, within from 15 minutes to 5 hours.

6. A printing ink comprising a composition according to claim 3.

7. The process for producing a pigment composition, according to claim 1, wherein resulting composition is further kneaded or extruded with from 0 to 300% by weight, based on the composition, of a binder which is solid at 20° C.

8. A pigment dispersion comprising
a dry-milled mixture comprising
from 10 to 25% by weight, based on the total weight of the dispersion, of a dry-milled pigment;
from 150 to 400% by weight, based on the amount of crude pigment, of a resin composition comprising
from 5 to 100% by weight, of a phenol-modified rosin fraction of weight-average molecular weight from 5000 to 40000 Da;
from 5 to 80% by weight, of a hydrocarbon resin of softening point from 105 to 165° C.;
from 5 to 50% by weight, of an esterified rosin;
from totally 5% by weight to a maximal total percentage comprising each below 5% by weight, of two resins selected from the group consisting of said phenol-modified rosin fraction, said hydrocarbon resin and said esterified rosin; or
from totally 5% by weight to a maximal total percentage comprising each below 5% by weight, of all three resins of the group consisting of said phenol-modified rosin fraction, said hydrocarbon resin and said esterified rosin;
each based on the weight of the resin composition; and
from 1 to 10% by weight, based on the amount of crude pigment, of an antioxidant, and
further comprising from 80 to 700% by weight, based on the amount of said dry-milled pigment, of a liquid hydrocarbon.

9. A pigment dispersion according to claim 8, additionally comprising from 2 to 35% by weight of one or more hydrocarbon and/or modified hydrocarbon resins and from 5 to 35% by weight of one or more esterified rosins, both based on the total amount of phenol-modified rosins, hydrocarbon and/or modified hydrocarbon resins and esterified rosins in the pigment dispersion.

10. A pigment dispersion according to claim 8, further comprising from 1 to 50% by weight, based on the amount of pigment, of a $C_8$-$C_{24}$ alcohol.

11. A composition according to claim 3, additionally comprising a phenol-modified rosin of weight-average molecular weight from 70000 to 300000 Da.

12. A composition according to claim 11, wherein the resin composition comprises from 4.5 to 74.4% by weight, of a phenol-modified rosin fraction of molecular weight from 70000 to 300000 Da.

13. A process according to claim 1, wherein a phenol-modified rosin of weight-average molecular weight from 70000 to 300000 Da is added at any stage of the process.

14. An offset printing ink comprising a pigment dispersion according to claim 8.

15. A process for preparing an offset printing ink comprising the process according to claim 4 wherein the pigment dispersion is prepared with a disperser or with a single pass in an extruder with an energy input of from 0.05 to 5 kJ per gram of pigment.

16. A process according to claim 1, wherein the pigment is a phthalocyanine, dioxazine or carbon black.

17. A process according to claim 1, wherein the pigment is an azo pigment.

18. A pigment dispersion according to claim 9, further comprising from 1 to 50% by weight, based on the amount of pigment, of a $C_8$-$C_{24}$ alcohol.

19. A pigment dispersion according to claim 8, additionally comprising a phenol-modified rosin of weight-average molecular weight from 70000 to 300000 Da.

20. A process according to claim 7, wherein a phenol-modified rosin of weight average molecular weight from 70000 to 300000 Da is added at any stage of the process.

* * * * *